United States Patent [19]

Shimomura et al.

[11] Patent Number: 4,749,275

[45] Date of Patent: Jun. 7, 1988

[54] OPTICAL POWER METER WITH AUTOMATIC SWITCHING OF PHOTODETECTORS HAVING DIFFERENT WAVELENGTH SENSITIVITY CHARACTERISTICS

[75] Inventors: Teiichi Shimomura, Atsugi; Kunio Ishikawa, Yamato, both of Japan

[73] Assignee: Shimadzu Corporation, Kyoto, Japan

[21] Appl. No.: 913,252

[22] Filed: Sep. 30, 1986

[30] Foreign Application Priority Data

Oct. 8, 1985 [JP] Japan .............................. 60-224576

[51] Int. Cl.$^4$ .......................... G01J 1/42; H01J 40/14
[52] U.S. Cl. .................... 356/222; 356/224; 356/73.1; 250/214 R
[58] Field of Search ................. 250/208, 209, 214 A, 250/214 R; 356/73.1, 222, 224

[56] References Cited

U.S. PATENT DOCUMENTS 3,562,795 2/1971 Frenk ............................. 356/222
3,664,752 5/1972 Hermieu ......................... 356/224
4,260,255 4/1981 Wachs et al. .................... 356/222
4,467,203 8/1984 Rappaport ...................... 250/214 A Primary Examiner—Edward P. Westin
Assistant Examiner—Khaled Shami
Attorney, Agent, or Firm—Birch, Stewart, Kolasch & Birch

[57] ABSTRACT

An optical power meter system comprises a chopper with a semicircular total reflection mirror along an incident light path, two photo-detectors of different characteristics of wavelength sensitivity, and a comparator for comparing the levels of the photo-detection signals derived from the two photo-detectors and for outputting the optical detection signal of a higher level. The photo-detectors are positioned in a first path of the light passing through the chopper and a second path of the light reflected by the chopper, respectively. The comparator may be replaced by an adder for adding the photo-detection signals derived from the two photo-detectors.

6 Claims, 2 Drawing Sheets

OPTICAL POWER METER WITH AUTOMATIC SWITCHING OF PHOTODETECTORS HAVING DIFFERENT WAVELENGTH SENSITIVITY CHARACTERISTICS

BACKGROUND OF THE INVENTION

The present invention relates to an optical power meter and more particularly, to an optical power meter for selectively switching at least two photo detectors.

Conventionally, in the field of optical fiber communication, an optical power meter is used to measure the optical characteristics of a light emission element and the transmission characteristics of the optical signal in an optical fiber. A photoelectric conversion element such as a photodiode and a photo-transistor is provided as a photo detector of the optical power meter. The photoelectric conversion element has wavelength sensitivity characteristics according to which photoelectric conversion element responds to the wavelengths corresponding thereto. Since the wavelength sensitivity characteristics of the photoelectric conversion element are fixed, light having a wavelength outside the region of the sensitivity characteristics cannot be detected. The characteristics of wavelength sensitivity can cover only a narrow region of the spectrum. To measure power of the optical signals over a wide wavelength region, a plurality of photoelectric conversion elements must be provided of which respective wavelength sensitivity characteristics can cover only limited parts of the wide wavelength range. Depending on these parts of the wavelength region, an appropriate one of the plurality of photoelectric conversion elements must be selected and exchanged. Thus, the measurement of optical power becomes troublesome.

SUMMARY OF THE INVENTION

Accordingly, it is an object of the present invention to provide an improved optical power meter for efficiently measuring the power of an optical signal over a wide wavelength range without exchanging photoelectric conversion elements.

It is another object of the present invention to provide an improved optical power meter for selectively switching at least two photo-detectors of which wavelength sensitivity characteristics are different from each other in order to output an optical detection signal of a higher level.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an optical power meter system comprises chopper means with a total reflection mirror, at least two photo-detectors of different characteristics of wavelength sensitivity, and comparator means for comparing the photo-detection signals derived from the two photo-detectors and outputting the optical detection signal of a higher level. The chopper is positioned in an incident light path. The photo-detectors are positioned in a first path of the light passing beside the chopper and in second path of the light reflected by the chopper, respectively.

In another preferred embodiment of the present invention, the comparator in the first preferred embodiment can be replaced by adder means for adding the photo-detection signals derived from the two photo-detectors.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
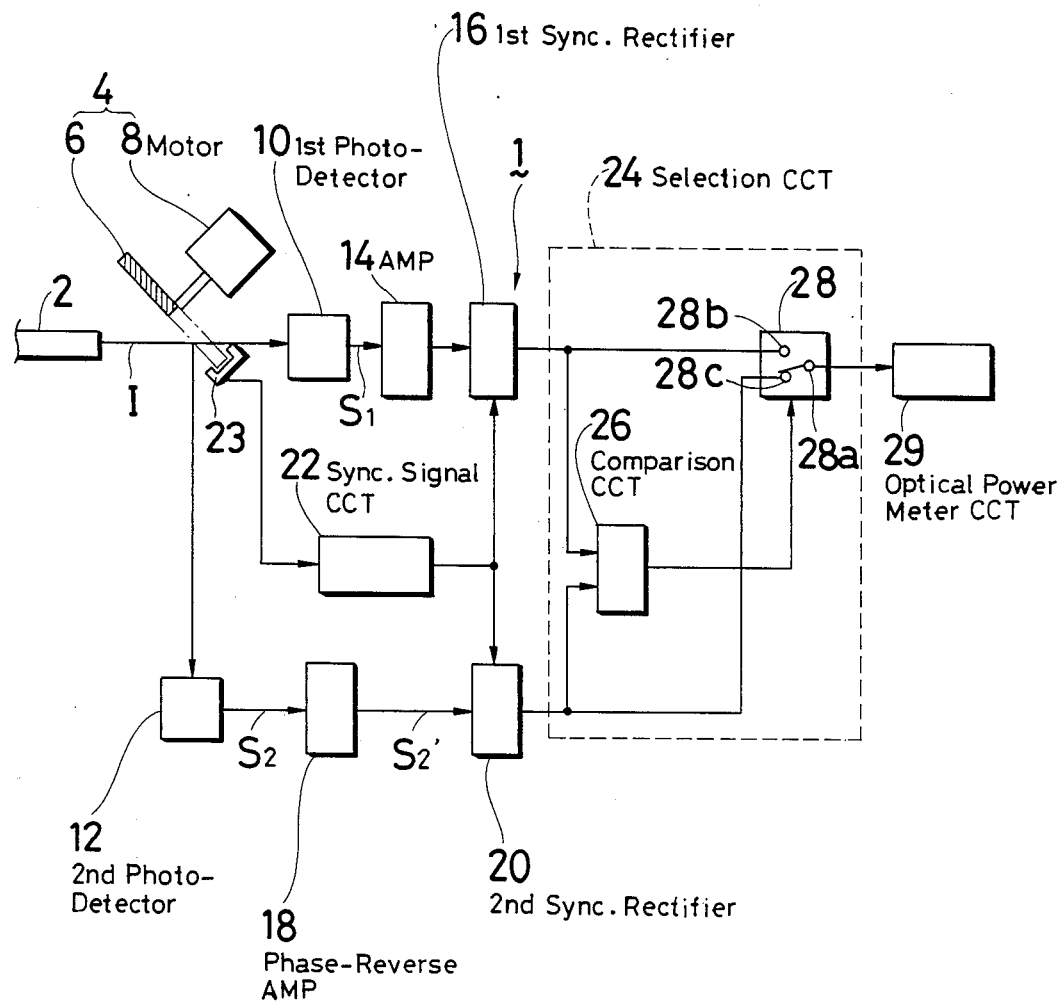
FIG. 1 is a block diagram of an optical power meter system according to one preferred embodiment of the present invention.

FIG. 1 is a block diagram of an optical power meter according to one preferred embodiment of the present invention. The optical power meter system 1 receives an optical signal under measurement through an optical fiber 2. A light chopper 4 is disposed in an incident light path I. The light chopper 4 includes a semicircular total reflection mirror 6 which is positioned in the incident light path I being tilted at a predetermined angle less than 90°, preferably 45°. The total reflection mirror 6 is coupled to the axis of rotation of a motor 8.

Figure 2:
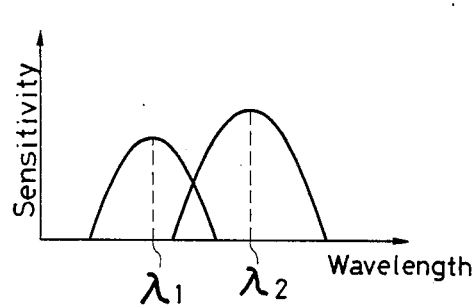
FIG. 2 is a graph of the characteristics of the wavelength sensitivity of a photoelectric conversion element incorporated within a photo-detector used for the optical power meter system of the present invention.

A first photo-detector 10 is positioned in the path of the light from optical fiber 2 unreflected by the total reflection mirror 6. A second photo-detector 12 is positioned in the path of the light reflected by the total reflection mirror 6. As shown in FIG. 2, the first photo-detector 10 comprises a first photoelectric conversion element providing a peak value at a wavelength $\lambda_1$ (lambda 1) while the second photo-detector 12 comprises a second photoelectric conversion element providing a peak value at a wavelength $\lambda_2$ (lambda 2).

An amplifier 14 is provided for amplifying a photo-detection signal delivered from the first photo-detector 10. A first synchronous rectifier 16 is provided for synchronously rectifying the photo-detection signal outputted by the amplifier 14. A phase-reverse amplifier 18 is provided for amplifying a photo-detection signal delivered from the second photo-detector 12 and reversing the phase of the photo-detection signal by 180°. A second synchronous rectifier 20 is connected to synchronously rectify the photo-detection signal outputted by the phase-reverse amplifier 18. A synchronous-signal generator 23 with a light source and a photo-detector is coupled to the optical chopper 4 and an output signal of the generator 23 is applied to the first synchronous rectifier 16 and the second synchronous rectifier 20 through a synchronous signal circuit 22.

A selection circuit 24 is provided for selectively outputting a higher level photo-detection signal by comparing the photo-detection signals outputted from first and the second photo-detectors 10 and 12. In this preferred embodiment, the selection circuit 24 comprises a comparison circuit 26 and a switch 28. The comparison circuit 26 is responsive to the photo-detection signals from the first and the second photo-detectors 10 and 12 to compare the levels of the photo-detection signals in order to output a comparison signal representing which photo detection signal is of a higher level. The switch 28 is responsive to the comparison signal outputted by the comparison circuit 26 to switch the photo-detection signals outputted by the first and the second synchronous rectifiers 16 and 20 to power meter 29. The switch 28 has three terminals 28a, 28b, and 28c. The optical power meter circuit 29 is coupled to the terminal 28a.

Figure 3:
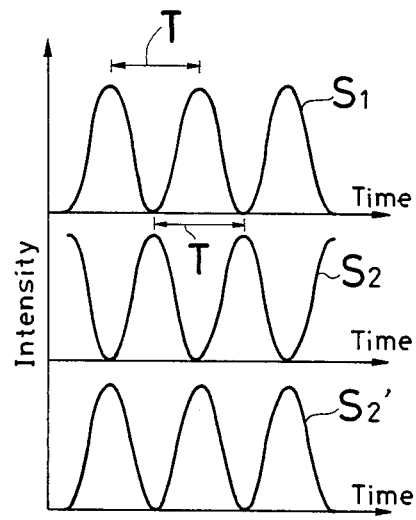
FIG. 3 is a graph of photo-detection signals outputted by the photo-detector.

The light signal from the optical fiber 2 is incident on the chopper 4 to measure the power of the optical signals with the above-arranged optical power meter. The light from the optical fiber 2 is alternatively split to the detectors 10 and 12 by the optical chopper 4. Therefore, each output of the detectors 10 and 12 has an alternative signal which has 180° phase difference with the other, as shown in FIG. 3.

The output signal $S_1$ of the detector 10 is amplified by the amplifier 14, the amplified signal is rectified by the first synchronous rectifier 16 in synchronism with the synchronous signal outputted by the synchronous-signal circuit 22. The synchronously rectified outut is applied to the terminal 28b of the switch 28 and to a first input terminal of the comparison circuit 26. The output signal $S_2$ of the second detector 12 is amplified and phase-reversed at 180° by the phase-reverse amplifier 18 to produce a signal $S_2'$ with the same phase as signal $S_1$. This signal $S_2'$ is applied to the second synchronous rectifier 20, so that it is synchronously rectified with the synchronous signal outputted by the synchronous signal circuit 22. The synchronously rectified output is applied to the terminal 28c of the switch 28 and to a second input terminal of the comparison circuit 26.

The comparison circuit 26 compares the output signal levels of the first and the second synchronous rectifiers 16 and 20. It outputs a comparison signal representing which of the signals $S_1$ and $S_2$ has a larger level. The comparison signal is applied to the switch 28. When the comparison signal indicates that the level of the signal $S_1$ derived from the first photo-detector 10 is larger than the level of the signal $S_2$ from the second photo-detector 12, the switch 28 connects the common terminal 28a to the terminal 28b. On the contrary, when the comparison signal represents that the level of the signal $S_2$ is larger than that of the signal $S_1$, the switch 28 connects the common terminal 28a to the terminal 28c. Thus, the switch 28 is switched as to receive the photo-detection signal of the higher level in response to the comparison of the levels of the photo-detection signal $S_1$ and $S_2$. The selection circuit 24, therefore, can continue to output the photo-detection signal derived from the photo-detector 10 or 12 which can appropriately respond to the wavelength of the optical signal under measurement. The power of the optical signal over the added wavelength zones of the first and the second photo-detectors 10 and 12 can be measured by the above-arranged optical power meter system 1.

In the above preferred embodiment, the total reflection mirror 6 is rotated by the motor 8, but it should not be limited to this. It may be possible that the total reflection mirror 6 is merely slided into the incident light path I remaining at a tilted angle. Instead of first and the second synchronous rectifiers 16 and 20, a tuning amplifier and a rectifier circuit may be combined in which case the phase-reverse amplifier 18 and the synchronous signal circuit 22 can be omitted.

Figure 4:
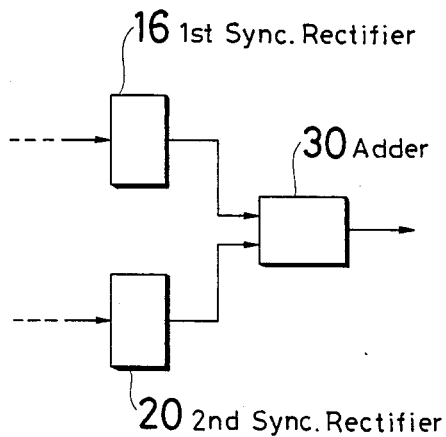
FIG. 4 is a block diagram of an optical power meter system according to another preferred embodiment of the present invention.
Figure 5:
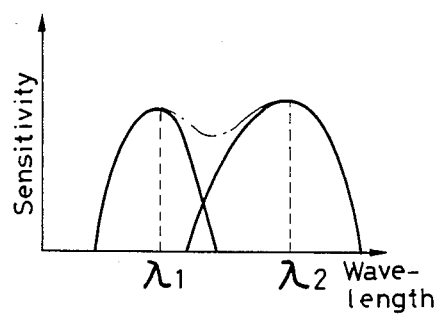
FIG. 5 is a graph of the characteristics of wavelength sensitivity given by the optical power meter system of FIG. 4.

Further, instead of the comparison circuit 24, an adder 30 as shown in FIG. 4 can be provided for adding the synchronously detected output signals from the first and second synchronous rectifiers 16 and 20. The output of the adder 30 is shown in the chain line and the solid line of FIG. 5, so that the additive characteristics of the photo-sensitivity of the first and the second synchronous rectifiers 16 and 20 can be obtained.

As described above, in accordance with the optical power meter system, the light signal from the optical fiber 2 is chopped by the chopper 4 to alternatively switch the light path for the incident light and the reflected light. The incident light and the reflected light are introduced into photo-detectors respectively having the different chracteristics of wavelength sensitivity. Each of a photo-detectors outputs the photo-detection signal which is inputted into the comparison circuit. The comparison circuit compares the photo-detection signals so as to produce a comparison signal indicating the photo-detection signal of higher level. In other words, the comparison circuit outputs the comparison signal indicating which of the photo-detectors has sensitivity suitable for the wavelength of the light under measurement. In place of the comparison circuit, an adder may be provided for adding the photo-detection signals levels obtained by the photo-detectors. Thus, measurement of the power over the range of the whole wavelength spectrum of every photo-detector is possible.

In accordance with the present invention, the power of the optical signal can be efficiently and effectively measured over the wide range of the wavelength without having to change photo-electric conversion elements.

While only certain embodiments of the present invention have been described, it will be apparent to those skilled in the art that various changes and modifications may be made therein without departing from the spirit and scope of the invention as claimed.

What is claimed is:

1. An optical power meter for measuring the power of an optical signal, comprising:
   first photodetector means, having a wavelength sensitivity of a first range, for converting an inputted optical signal into a first electrical signal;
   second photodetector means, having a wavelength sensitivity of a second range, for converting an inputted optical signal into a second electrical signal;
   light path switching means for switching said optical signal to be alternatively inputted to said first and second photodetector means;
   synchronous signal generator means for producing a signal synchronous with the switching of said light path switching means;
   first level detection means for detecting the level of said first electrical signal in synchronism with the synchronous signal;
   second level detection means for detecting the level of said second electrical signal in synchronism with said synchronous signal; and selection means, responsive to outputs of said first and second level detection means, for selecting the electrical signal of higher level as the signal to be measured.

2. The optical power meter of claim 1, wherein said selection means comprises a comparison circuit and a switch, said compArison circuit comparising the levels of the outputs of said first and second level detection means and producing a comparison signal depending on the comparison result, said switch comprising a first contact connected to said first level detection means and a second contact connected to said second level detection means, and a third contact moved between said first and second contacts in response to the comparison signal.

3. The optical power meter of claim 1, wherein said light path switching means comprises a total reflection mirror chopper including a total reflection mirror, said total reflection mirror being tilted at an angle less than 90° from the angle of said optical signal, said chopper rotating said total reflection mirror so as to alternatively obstruct the path of said optical signal so as to direct said optical signal to inputs of said first and second photodetector means alternatively.

4. The optical power meter of claim 1, wherein said second level detection means includes means for reversing the phase of said second electrical signal.

5. An optical power meter for measuring the power of an optical signal, comprising:

first photodetector means, having a wavelength sensitivity of a first range, for converting an inputted optical signal into a first electrical signal;

second photodetector means, having a wavelength sensitivity of a second range, for converting an inputted optical signal into a second electrical signal;

light path switching means for switching said optical signal to be alternatively inputted to said first and second photodetector means;

synchronous signal generator means for producing a signal synchronous with the switching of said light path switching means;

first level detection means for detecting the level of said first electrical signal in synchronism with the synchronous signal;

second level detection means for detecting the level of said second electrical signal in synchronism with said synchronous signal; and adder means, responsive to outputs of said first and second level detection means, for adding said outputs and producing an output signal representative of the result of the addition.

6. The optical power meter of claim 5, wherein said light path switching means comprises a total reflection mirror chopper including a total reflection mirror, said total reflection mirror being tilted at an angle less than 90° from the angle of said optical signal, said chopper rotating said total reflection mirror so as to alternatively obstruct the path of said optical signal so as to direct said optical signal to inputs of said first and second photodetector means alternatively.

* * * * *